April 11, 1950 J. ANTOS 2,503,239
AUTOMATIC SLIDE PROJECTOR
Filed June 25, 1945 9 Sheets-Sheet 2

Inventor
Joseph Antos

April 11, 1950

J. ANTOS 2,503,239

AUTOMATIC SLIDE PROJECTOR

Filed June 25, 1945

Inventor
Joseph Antos

April 11, 1950 J. ANTOS 2,503,239
AUTOMATIC SLIDE PROJECTOR
Filed June 25, 1945 9 Sheets-Sheet 5

Fig.12

Inventor
Joseph Antos

April 11, 1950 J. ANTOS 2,503,239
AUTOMATIC SLIDE PROJECTOR
Filed June 25, 1945 9 Sheets-Sheet 7

Inventor
Joseph Antos

April 11, 1950          J. ANTOS          2,503,239

AUTOMATIC SLIDE PROJECTOR

Filed June 25, 1945          9 Sheets-Sheet 8

Inventor
Joseph Antos

Inventor
Joseph Antos

Patented Apr. 11, 1950

2,503,239

UNITED STATES PATENT OFFICE 2,503,239

AUTOMATIC SLIDE PROJECTOR

Joseph Antos, Aurora, Ill., assignor of one-sixth to James D. Benbow, Aurora, Ill.

Application June 25, 1945, Serial No. 601,466

23 Claims. (Cl. 88—28)

My invention relates to a new and novel means of supporting in a container a stack of slides above the projecting lens and automatically releasing them one at a time to be projected on a screen and, after being projected, releasing the projected slide and placing same in another slide container in the same sequential order.

Most of the slide projectors heretofore offered to the public have required a raising, lowering or sidewise moving device to place the slide into a projecting position, which caused considerable wear and tear on the slides. My automatic projecting device prevents in a great measure the above-mentioned wear and tear by having gravity deposit the slide into a projecting position and, after projection, gravity will also deposit the slide in position to be pushed into the lower container.

Another object of my invention is to provide means to support a movable slide container above the projecting lens and to provide means to remove the slides one at a time from the container and provide guide means to cause the slide to fall horizontally and tilt vertically to the projecting position, and after being projected, to automatically drop into a receiving container in the same sequence as projected.

Another object of my invention is to provide means whereby the operator can cause the slides to change at will.

Another object of my invention is to provide the automatic operation of the slide changing unit by the use of sound to automatically change the slides in the slide changing unit by synchronizing the sound reproducing unit with the changing of the slides.

Another object of my invention is to combine the automatic timing, the manual operation and the remote control of projecting and changing slides in one projector, thus permitting the operator to make the selection at the same time of projecting the slides and thereby not be compelled to have attachments.

Another object of my invention is in the means whereby projecting and changing of the slides can be shifted from automatic to manual, to remote control, or coupled to a sound reproducing unit where a voice commentary or music, or both, recorded on a recording medium such as a disc, wire, or film, will automatically cause the slide changing unit to operate at the proper intervals.

Another object of my invention is to provide a slide changing unit as a separate part that can be adapted for use in connection with slide projectors now on the market.

Another object of my invention is to provide a novel form of slide container, which can be used on top of the projector for feeding the slides, and another container of the same design can be placed below the projecting lens for receiving the projected slides and the slides can be sorted in said container for future use.

Other objects, advantages and capabilities inherent in the invention will later more fully appear.

The invention further resides in the combination, construction and arrangement of parts shown in the accompanying drawings, and while I have shown therein preferred embodiments, I wish it understood that the same are susceptible of modification and change without departing from the spirit of the invention.

Referring to the drawings.

Description

The projector consists of three units and two slide containers (see Figures 1, 2, 3, 4, 5, 6, 9, 10 and 12). The base or support 1 is rectangular in shape, but it can be made in any desired shape. The base or support 1 has four rubber pads 103 mounted on the bottom to prevent scratching or marring polished surfaces, such as a table, etc.

Figures 10, 11:
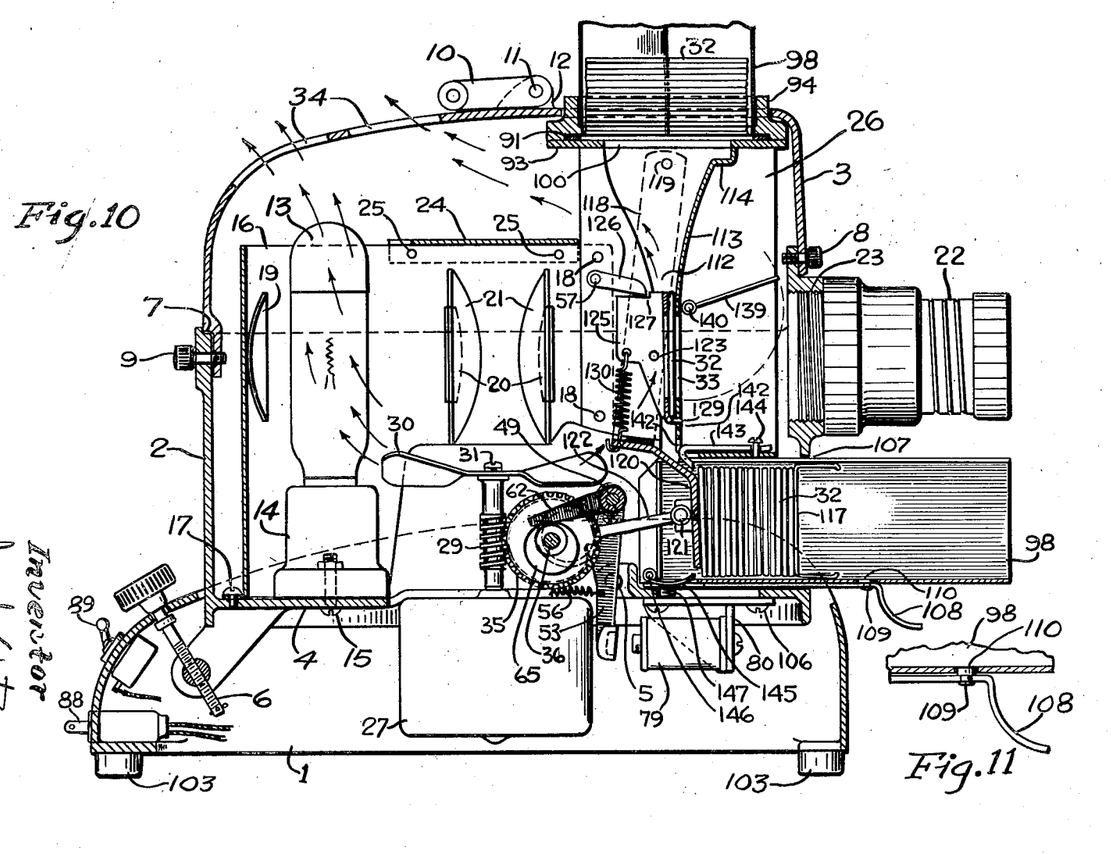
Figure 10 is a cross section thru 10—10 of Figure 6.
Figure 11 is a sectional view of lower slide magazine lock.
Figure 12:
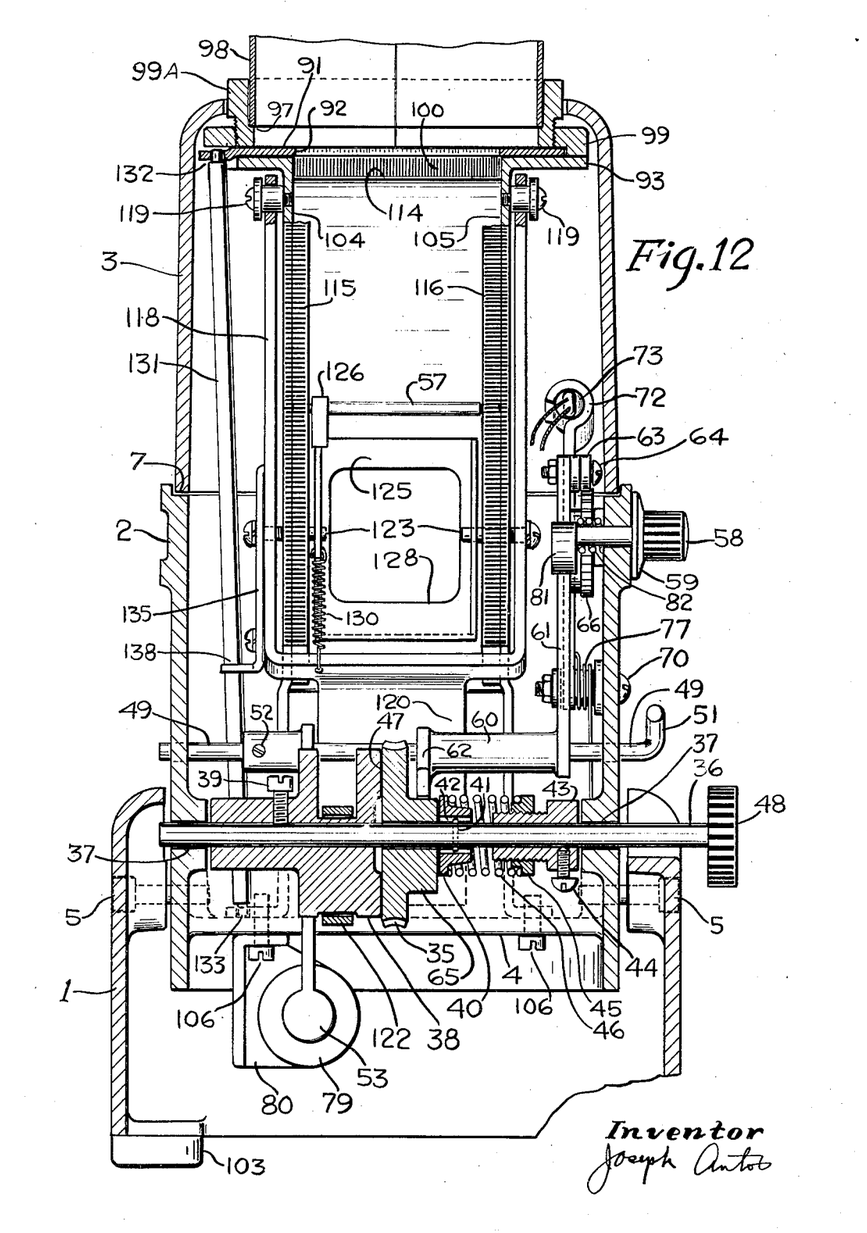
Figure 12 is section 12—12 of Figure 9 and 10, looking toward the front of projector.

The base or support 1 has an opening at the top shaped to permit the main body 2 to be inserted therein and is pivotally supported by two pivot screws 5 and an adjustable tilting screw 6 (see Figures 10 and 12). The main body 2 houses and has mounted thereon all the principal parts of the optical system and the slide changing unit.

A cover 3 forms the top portion of the projector and fits into a recess at 7, thus forming a lighttight connection, and is secured to main body 2 at its forward portion by a knurled head screw 8 and at its rear portion by knurled head screw 9. A folding carrying handle 10 is fastened by rivets 11 to brackets 12, located on top of the cover 3 near the center of gravity, thus providing a convenient means for carrying the projector.

The optical system of this projector consists of a light bulb 13 inserted in socket 14 (see Figures 6, 9 and 10), which is mounted on the bottom 4 of the main body 2 by any known means, such as bolts 15. A shield 16, made in a U shape of one or more parts, is fastened to the bottom 4 by bolt 17 and on the sides at the front by four bolts 18, two on each side. To the rear portion of shield 16 is attached the reflector 19. Directly ahead of the bulb 13 and positioned in notches 20 are the two condensing lenses 21. In the path of the projected light beam is an adjustable objective lens 22, having a threaded portion screwed into the main body 2 at 23. Above the condensing lens 21 is a U-shaped plate 24 fastened by bolts 25 to the shield 16 to prevent light from reflecting upward. Between the condensing lens 21 and the adjustable objective lens 22, and extending vertically within the main body 2, is the slide changing unit indicated as 26. (See Figures 6, 9, 10, 12, 13, 15, 16, 17, 18, 19, 20, 21 and 22.)

On the underside of the bottom 4 of the main body 2 is mounted a motor 27, which furnishes all the motive power required to operate the automatic slide changing unit 26 and the cooling system (see Figures 6, 9, 10 and 13). The shaft 28 of the motor 27 projects upward to the inside of the main body 2 and has mounted thereon a worm 29, upon which is attached the cooling fan 30 by means of screw 31. The cooling fan 30 draws cool air from the underside of the projector, causing the air to flow upward in the direction of the arrows (see Figure 10), thus cooling the light bulb 13 and the slide 32 in the projector aperture 33, and finally pushing the air current upward to the outside of the projector thru the slots 34 in the top of the cover 3. The worm 29 drives the worm gear 35, which is rotatably mounted on the long horizontal shaft 36, which is supported within the main body 2 at each end by bearings 37.

Figures 13, 14:
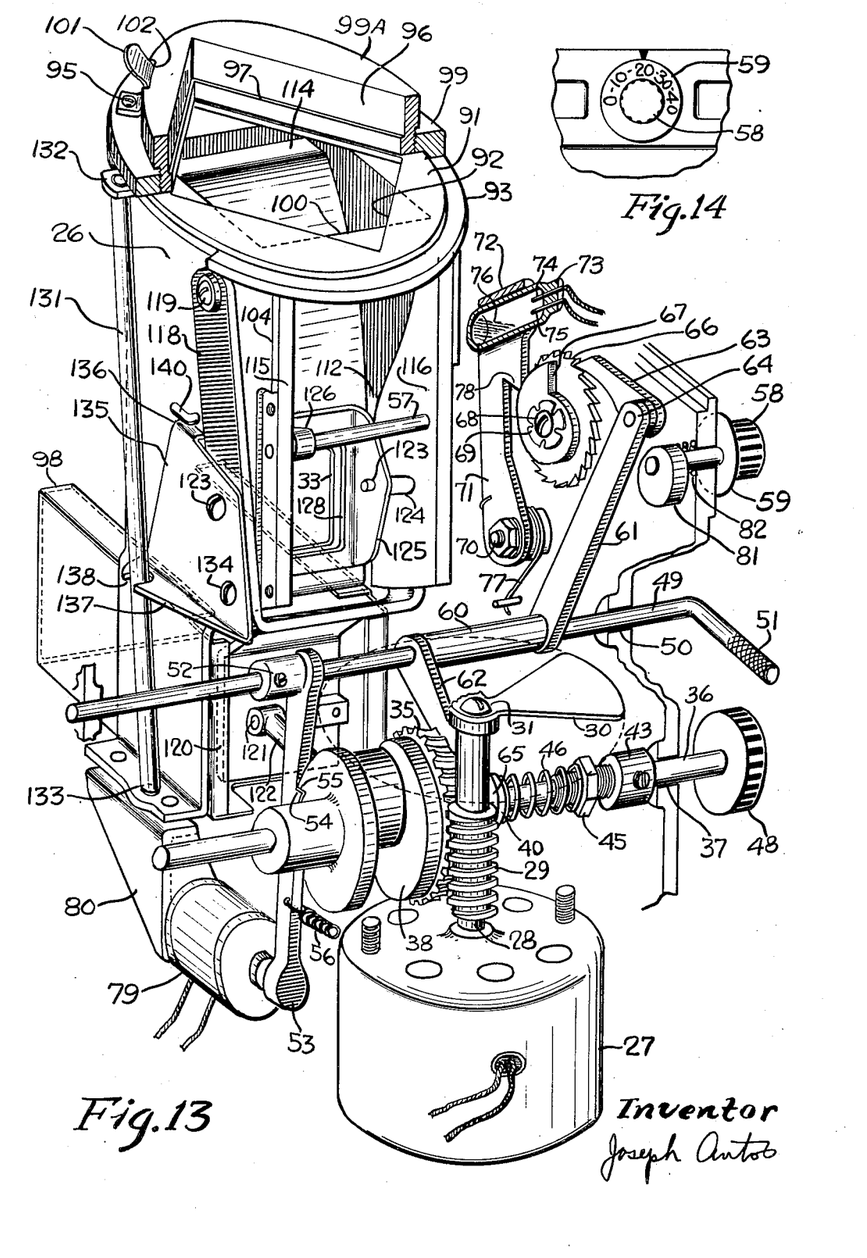
Figure 13 is a schematic picture of the slide changing mechanism, looking from the rear portion of the machine.
Figure 14 is a side view of selector dial and knob.

Referring to Figures 12 and 13, mounted on horizontal shaft 36 to the left of and contacting the worm gear 35 is an eccentric 38, which is fastened to the horizontal shaft 36 by set screw 39. To the right of the worm gear 35 on the horizontal shaft 36 is mounted a slidable collar 40 by means of either a shaft key 41 or a vertical pin in the horizontal shaft 36, which shaft key 41 engages keyways 42 in the slideable collar 40. At the extreme right and adjoining the side of the main body 2 on the horizontal shaft 36 is mounted a long collar 43 by set screw 44, having a threaded portion upon which is mounted an adjustable threaded collar 45.

One end of the compression spring 46 is mounted on slidable collar 40 and the opposite end on the adjustable collar 45.

The rotation of the eccentric 38 and the horizontal shaft 36 is accomplished by the friction exerted by the worm gear 35 at the surface 47. On the outside of the main body 2 on the horizontal shaft 36 is a knurled knob 48 for manually rotating the horizontal shaft 36 and the eccentric 38. The degree of pressure or the amount of friction exerted by the spring 46 on the slidable collar 40 and the worm gear 35 against the face of the eccentric 38 at the surface 47 is determined by adjusting the adjustable collar 45.

Due to the friction set up at surface 47 between the worm gear 35 and the eccentric 38, it is apparent that the eccentric 38 will continue to rotate with the rotation of the worm gear 35 and as all the slide changing operations are controlled by the rotation of the eccentric 38 it is only necessary to control its movements. For this purpose a horizontal rod 49 is provided, which is supported by bearings 50 at each side of the main body 2, having one end bent to form the lever 51. Fastened to the horizontal rod 49 with the set screw 52 is the hub of the lever 53, which has a hook 54 to engage the notch 55 of the eccentric 38 to keep it from turning.

To manually operate the timing of the slide changing mechanism, it is only necessary to depress the lever 51 momentarily. This pulls the hook 54 of the lever 53 away from the notch 55 of the eccentric 38 and permits the horizontal shaft 36 and the eccentric 38 to revolve, and at the end of a complete revolution, the spring 56 will force the hook 54 of the lever 53 to again engage the notch 55 of the eccentric 38. If the lever 51 is held depressed for any length of time, it will permit the eccentric 38 to revolve until the lever 51 is raised, and thus the operator can control the number of slides he wishes to be passed without showing.

The time interval of the projection of each slide can also be controlled electrically by a special mercury switch 73 of such construction as is shown in Figures 7, 8, 12 and 13, which is mounted on the inside of the main body 2 and is controlled by the position of the selector knob 58 on the dial 59, located on the outside of the main body 2 (see Figures 1, 6, 12, 13 and 14).

A lever assembly 60, consisting of a vertical lever 61 and a horizontal lever 62 having a pawl 63 pivoted to the vertical lever 61 by bolt 64, is rotatably mounted on the horizontal rod 49. The lever assembly 60 has a continuous rocking movement, due to the contact of the horizontal lever 62 on the cam 65, which is a part of the hub of the worm gear 35. During the rocking movement of the lever assembly 60, pawl 63, which engages the teeth of the ratchet wheel 66, will rotate the step cam 67, which is a part of the ratchet wheel 66 (see Figures 7 and 13). The step cam 67 and the ratchet wheel 66 are rotatably secured to the inner side wall of the main body 2 thru the bearing screw 68 and the spring cup washer 69. The spring cup washer 69 applies sufficient frictional drag to the ratchet wheel 66 and the step cam 67 so that they will stay in a stationary position during the rearward stroke of the pawl 63.

Attached to the same side of the main body 2 by pivot screw 70, directly ahead of the step cam 67, is a vertical arm 71, the upper end of which has a socket 72 in which is inserted the mercury switch 73. The normal position of the mercury switch 73 is tilted so that the two electrodes 74 and 75 are above and away from the mercury 76. As the step cam 67 is rotated forward with the consecutive strokes of the pawl 63, the mercury switch 73 and the lever or vertical arm 71 are likewise moved forward against the tension of the spring 77 until the step cam 67 passes the hook 78 of the vertical arm 71, causing vertical arm 71 and mercury switch 73 to rapidly snap backward, and the mercury 76 in the mercury switch 73, due to momentum, will roll up the incline and momentarily cover the two electrodes 74 and 75, closing the circuit and energizing the coil 79, which is attached to the forward part of the bracket 80. The magnetic field of the coil 79 will attract and pull the lower end of the lever 53 forward against the spring 56 and disengage the hook 54 from the notch 55 and permit the eccentric 38 to follow the rotating of the worm gear 35 in the manner heretofore described.

Figures 1, 2, 3, 4, 5:
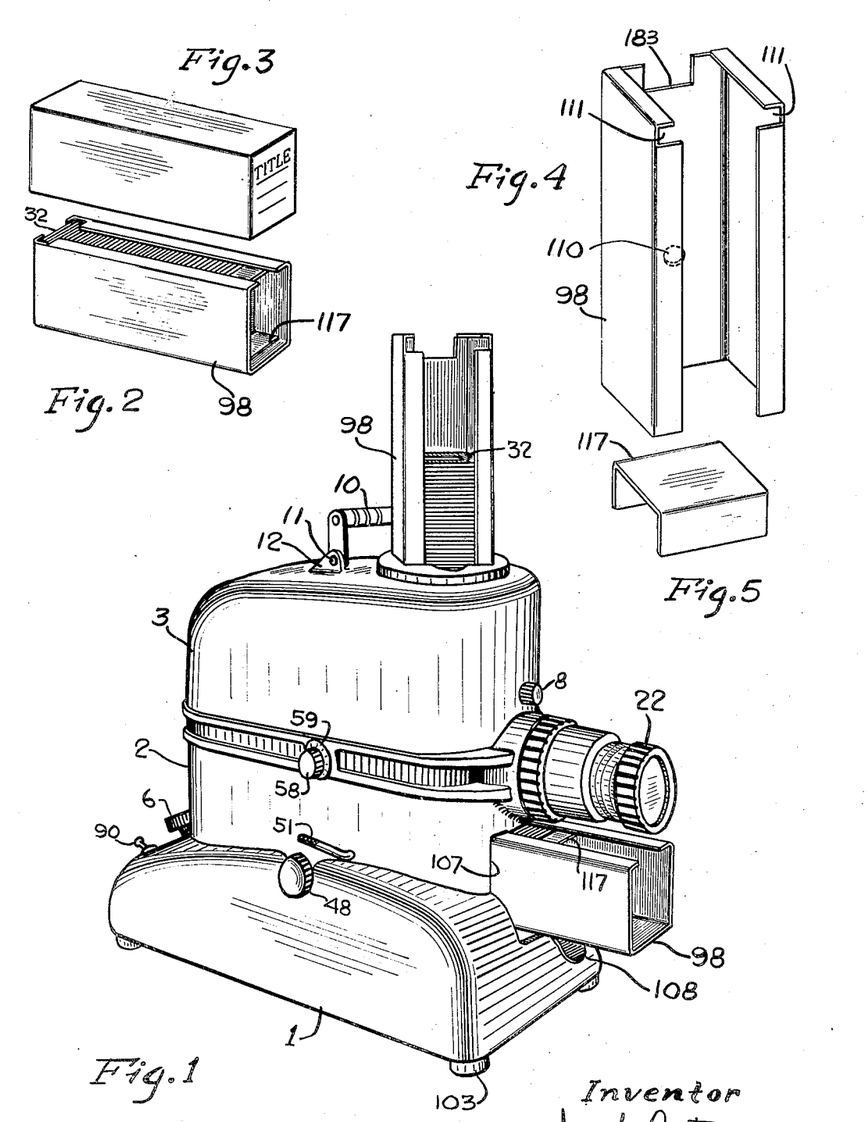
Figure 1 is a perspective view of the complete projector, with both slide magazines, in place and in an operative position.
Figure 2 is a perspective view of a slide magazine loaded with slides.
Figure 3 is a perspective view of the cover for slide magazine.
Figure 4 is a perspective view of an empty slide magazine.
Figure 5 is a perspective view of magazine slidable end gate.
Figures 6, 7, 8:
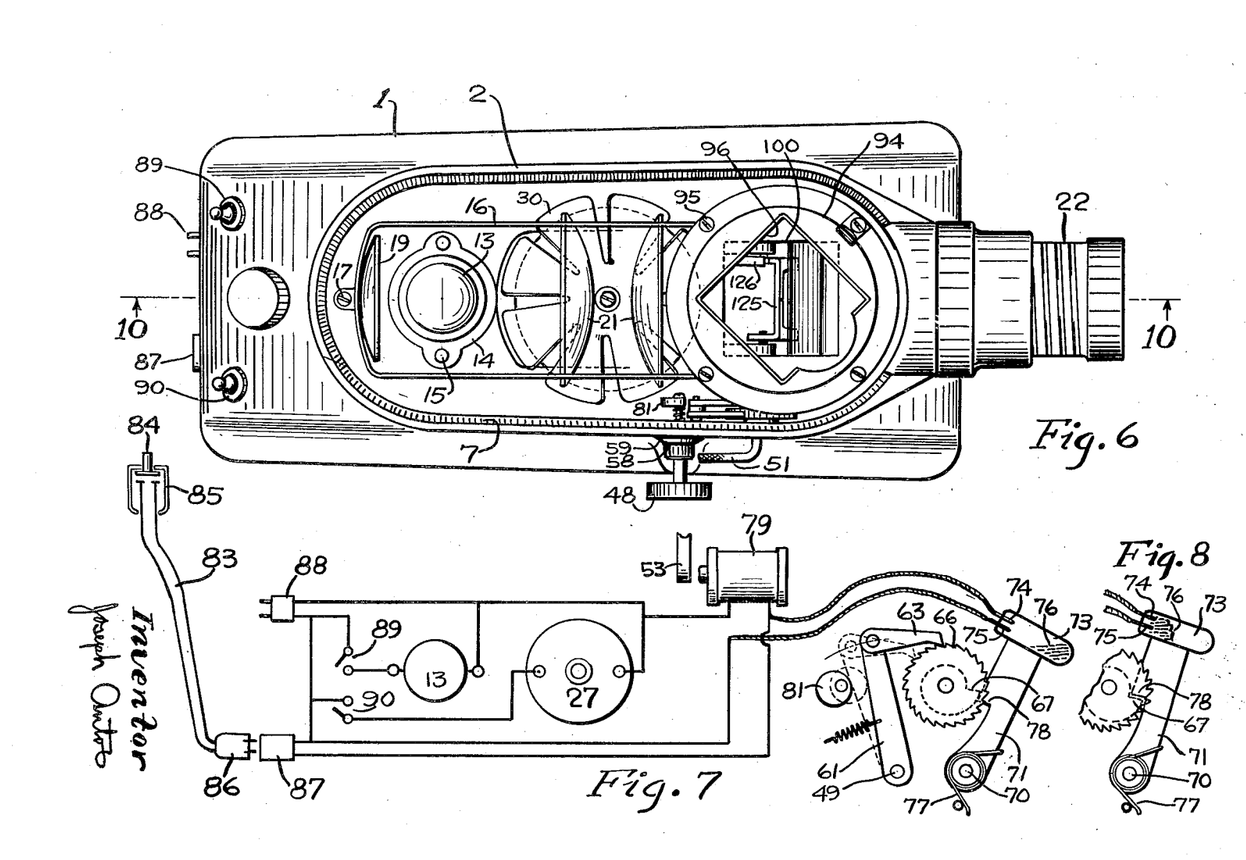
Figure 6 is a top view of projector with cover removed.
Figure 7 is a wiring diagram of the electrical system of the projector.
Figure 8 is the position of mercury switch and arm while engaging cam.

Directly behind the vertical lever 61, a cam 81 is connected to the selector knob 58 and held in a fixed position thru the spring 82. The cam 81 controls the length of the back stroke of the pawl 63, thus lengthening or shortening the slide changing intervals. With the high side of the cam 81 turned all the way back, as shown in Figure 7, the pawl 63 is allowed to travel its maximum distance, contacting each time as many as five or six teeth of the ratchet wheel 66, and thus permitting the minimum time interval between slide changes. As the cam 81 is rotated forward by means of the selector knob 58, the time interval between slide changes is increased until, when the cam 81 is turned directly forward toward the vertical lever 61, movement of the pawl 63 is prevented and the slide changing ceases to be automatic.

Figure 25:
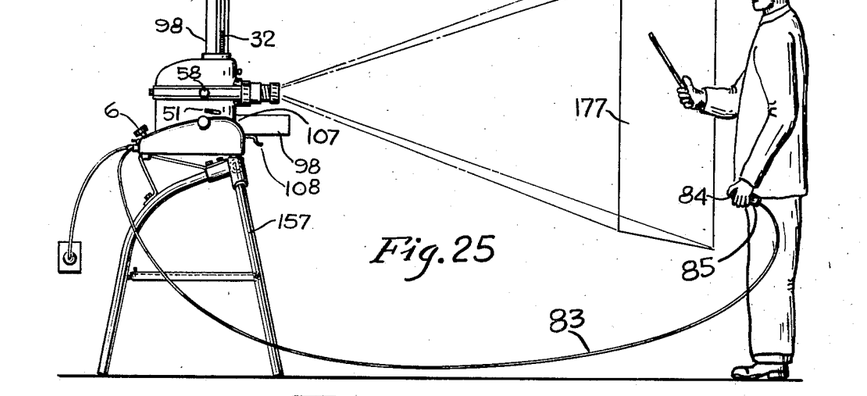
Figure 25 is a side view of Figure 1 projecting the picture on the screen and the operator describing the picture with the push button control of the slide changing unit.

The projector is then in a non-automatic position and operable only by depressing the lever 51 as heretofore described, or by using the extension cord 83, shown in Figures 7 and 25, and depressing the button 84 in switch 85. The extension cord 83 is connected to the projector thru the plugs 86 and 87. Sometimes it is desirable for an operator of the projector, especially when giving a lecture, to stand beside the screen and point out various points while facing the audience, changing the slide images by the operation of the switch 85, as shown in Figure 25.

The wiring arrangement is such as that shown in Figure 7. The plug 88 receives all the power, the switch 89 connecting the light bulb 13 and the switch 90 controlling the motor 27.

Figure 9:
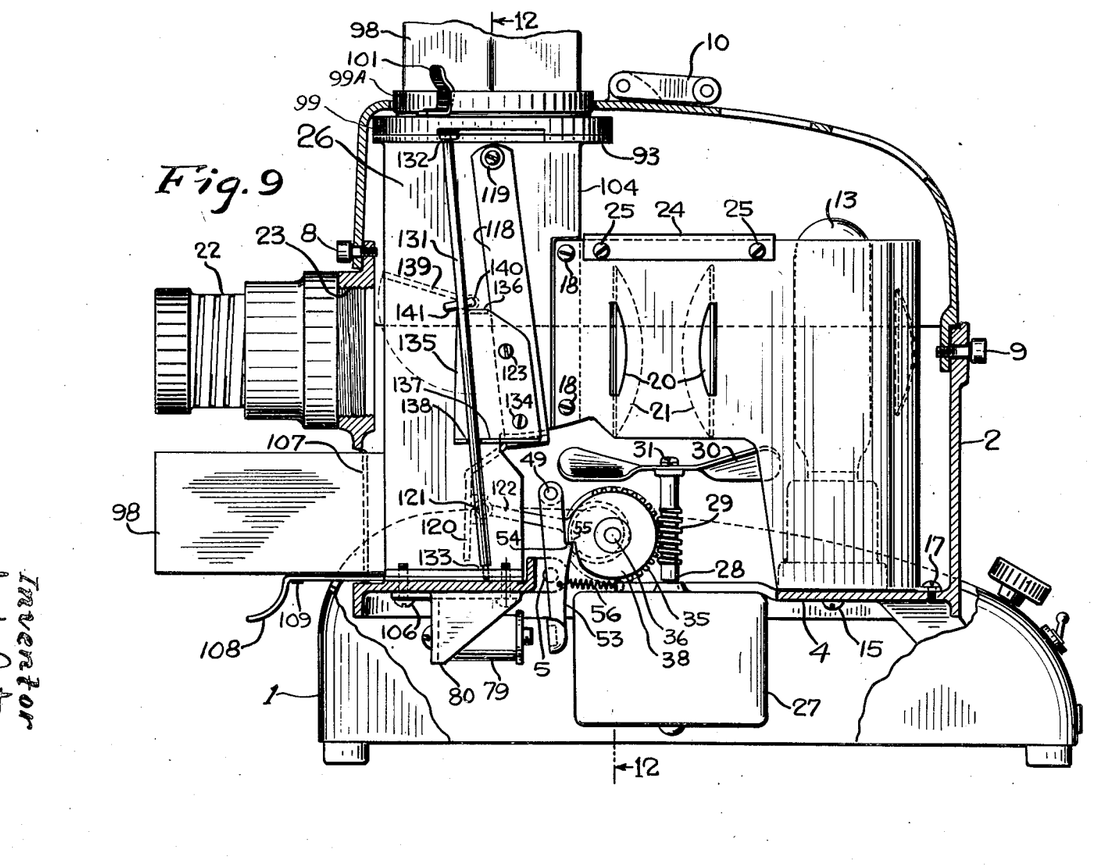
Figure 9 is a side view of projector slide changing mechanism with projector case cut away.

At the top of the slide changing unit 26 (see Figures 10, 16, 18 to 22) is a separating and rotating plate 91, circular in shape and having a square hole 92 in the center thereof, which rotates about 45 degrees on the surface plate 93. The socket 94 is recessed to form a guide and permit the rotation of the separating and rotating plate 91 and is fastened to the surface plate 93 by four or more screws 95. The socket 94 has a square hole 96 to receive the slide container 98 and has a ledge 97 to prevent the slide container 98 from dropping onto the separating and rotating plate 91. The socket 94a can be made adjustable for receiving slides of various thicknesses by making it in two parts and threading the upper part 99A and the lower part 99, as shown in Figures 9, 12 and 13. The socket 94 is positioned so that the square hole 96 is substantially 45 degrees out of line with the square hole 100 in the surface plate 93. The socket 99 and 99A is set to accommodate the standard thin paper mount slide. However, if glass mounted or other thicker slides are used, it is then only necessary to release the spring clip 101, which contacts the notch 102, and rotate the socket 99A one or more counterclockwise turns to provide proper clearance for the thickness of the slides to be shown.

The separating and rotating plate 91 is normally positioned so that its square hole 92 is in line with the square hole 96 of the socket 94, thus permitting the lower slide 32 in the slide container 98 to drop into the square hole 92 of the separating and rotating plate 91 and rest on the surface plate 93, as shown in Figures 12, 13, 15 and 16.

The slide changing unit 26 is supported by the bottom 4 of the main body 2 and has two spaced apart parallel plates 104 and 105 flanged at the lower end. Each plate is attached to the bottom 4 by two screws 106. The upper ends of the vertical plates 104 and 105 are attached to the surface plate 93 by welding or any other means, which in turn supports the socket 94 for receiving the slide container 98, which holds the slides (see Figures 1, 10, 16, 18, 19, 20, 21 and 22).

At the lower end and between the plates 104 and 105, on top of the bottom 4, is an opening 107 to receive the lower slide container 98, into which the slides drop after they have been projected. Attached to the bottom 4 at the opening 107 is a spring steel positioning clip 108, which, with a riveted pin 109, engages the positioning hole 110 in the slide container 98, thus insuring a proper alignment between the notches 111 in the slide container 98 and the guideway 112 in the slide changing unit 26.

The vertical plates 104 and 105 are spaced apart by the wall 113, which is bent forward at right angles at the bottom to form a top for the opening 107 and extends upward vertically and then curves forward to form a ledge 114 and is connected to front edge of the slide receiving hole 100 of the surface plate 93. On the inner and rearward portion of the vertical plates 104 and 105 are fastened guide bars 115 and 116 and the lower front edges face and extend parallel to the aperture 33, above which they curve rearward to stop at the rear edge of the slide receiving square hole 109. To form the guideways 112, guide bars 115 and 116 are connected or fastened to the vertical plates 104 and 105, or they can be of a one-piece casting as shown.

Thus it will be seen that we have a guideway 112 substantially square at the top to receive a slide 32 in a horizontal position, narrowing down to a position in the vicinity of the aperture 33, where it is only slightly wider than the thickest slide ever used. The rotation of the separating and rotating plate 91 will remove one slide at a time from the bottom of the stack of slides in the upper slide container 98 and the separating and rotating plate 91 will rotate to the position shown in Figures 17 and 18, thus permitting the slide 32 to be released at the receiving hole 109. A single slide, after being released at the receiving hole 100, will fall horizontally until the front edge contacts the ledge 114. Then the rear edge will swing downward by gravity, being guided by the curved edges of the guide bars 115 and 116 (see Figures 10, 16, 18, 19, 20, 21 and 22) to a vertical position in the lower and narrow position of guideway 112.

Directly on the outside of the vertical plates 104 and 105, yoke 118 is pivotally mounted at its upper end to vertical plates 104 and 105 by pivot screws and bushings 119 or shoulder screws, and at its lower end is attached a flat slide-ejecting pad 120. Fastened to the slide ejecting pad 120 by pin 121 is connecting rod 122, operated by eccentric 38. On both sides of the yoke 118 are screw studs 123, which pass thru slots 124 of the guide bars 115 and 116 and vertical plates 104 and 105 to pivotally support the slide positioning frame 125, located between the guide bars 115 and 116. Directly above the slide positioning frame 125 is located the trip latch 126, which is pivotally mounted by a pin or stud 57 to guide plates 115 and 116.

The slide positioning frame 125 is U-shaped and has an opening 128 to conform and coincide with the aperture 33. The lower edge of the slide positioning frame 125 has a right angle lip 129. The purpose of this slide positioning frame 125 is to catch the first slide 32 released by the separating and rotating plate 91 by the lip 129, which projects through an opening 142 in the wall 113, and hold it tightly and perfectly still in the projecting position (see Figure 19). Trip latch 126 engages the notch 127 in the top of the slide positioning frame 125 and the spring 130 is attached to the lower portion of the yoke 118 and to the rear of the U-shaped portion of the slide positioning frame 125. On the left hand side of the slide changing unit 26 is a lever 131 connected to the separating and rotating plate 91 at 132 and pivoted to the lower flanged portion of the vertical plate 104 at 133. On the same side and attached to the yoke 118 by the screws 123 and 134 is a bracket 135, having flanges 136 at the top and 137 at the bottom. The bottom flange 137 of the bracket 135 has a notch 138 to engage and oscillate the lever 131, which in turn rotates the separating and rotating plate 91 approximately 45 degrees forward and backward.

The shutter 139 is made of opaque or semi-opaque material and is attached to the rod 140, which is mounted in the vertical plates 104 and 105 directly above the aperture 33 in front of the wall 113 between the vertical plates 104 and 105. The rod 140 extends outside of the vertical plate 104 and is bent on one end to form a lever 141, which contacts the top flange 136 of the bracket 135 to raise and lower the shutter 139 during the oscillating movement of the yoke 118.

On the top of the right angled portion of the wall 113 at the opening 107 between the vertical plates 104 and 105 is mounted by the rivet 144 for up and down movement an upper slide retainer 143, having the inner portion made in a V shape. At the bottom of the opening 107 is the lower slide retainer 145 with an upward projecting lip mounted between the vertical side plates 104 and 105 for rotative movement by the pin 146, supported by the vertical plates 104 and 105. On the under side of the lower slide retainer 145 is a spring 147 supported by the bottom 4 to keep the lower slide retainer 145 in a normal position.

Figure 21:
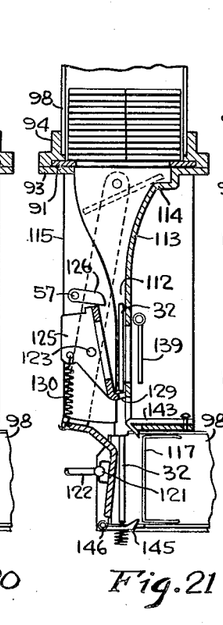
Figure 21 is a vertical cross sectional view of the slide changing unit showing the second slide in dropping and projecting position and the first slide ready to be pushed forward into the lower container with the shutter closed.
Figure 22:
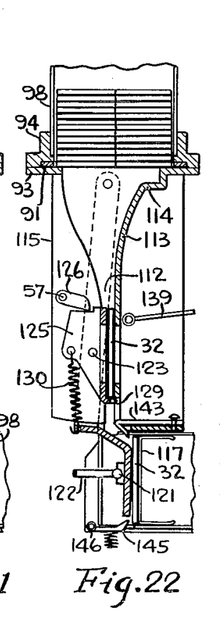
Figure 22 is a vertical cross sectional view of the slide changing unit showing the second slide clamped for projecting with the shutter open and the first slide pushed into the lower container.

The movement of the lower slide 32 by the ejecting pad 120 from the position shown in Figure 21 to the position shown in Figure 22 will cause the upper slide retainer 143 to move upward and the lower slide retainer 145 to depress the spring 147. When the lower slide 32 is in the position shown in Figure 22, the upper slide retainer 143 and the lower slide retainer 145 will return to their normal positions and hold the slide 32 in an upright position in the lower slide container 98.

Referring to Figures 1, 2, 4 and 5, the slide container 98 can be made to any desired length to hold any number of slides 32, usually 100 to 150. The slide container 98 as shown is made square, but it can be made to suit the dimensions of any size slide which is to be shown or projected. The slide container 98 as shown is made in a U shape, having the top edges and one end flanged to assist in retaining the slides 32 in a proper position. The notches 111 in the top flanged edges are to permit the slides 32 to drop vertically into the slide container 98 when they are placed in the opening 107 to receive the slides 32 after having been projected. The notch 183 is to provide room for the lower slide retainer 145 to move up and down. On the bottom of the slide container 98 there is a circular positioning hole 110 to permit the positioning pin 109 to hold the slide container 98 in its proper location in the opening 107 to permit the slide 32 to drop into the lower slide container 98 through the notches 111.

The end gate 117 is made in a U shape of spring steel, or some other metal, and the sides are bent slightly outward from a right angle to cause friction against the sides of the lower slide container 98 when used for receiving the projected slides 32.

When it is desired to operate the slide projector with the automatic slide changing unit 26, we take the slide container 98, which has been loaded with the slides 32, and remove the end gate 117 in the opening 96 of the socket 94 against the ledge 97, and place an empty slide container 98, with the end gate 117 against the ejecting pad 120, in the opening 107 to receive the slides 32 after they have been projected (see Figures 1, 10, 15, 16, 17, 18, 19, 21 and 22). I then connect the power line with the plug 88 of the slide projector and set the knob 58 on the dial 59 at the slide changing speed desired (see Figures 1, 6, 12, 13 and 14).

Figures 15, 16, 17, 18, 19, 20:
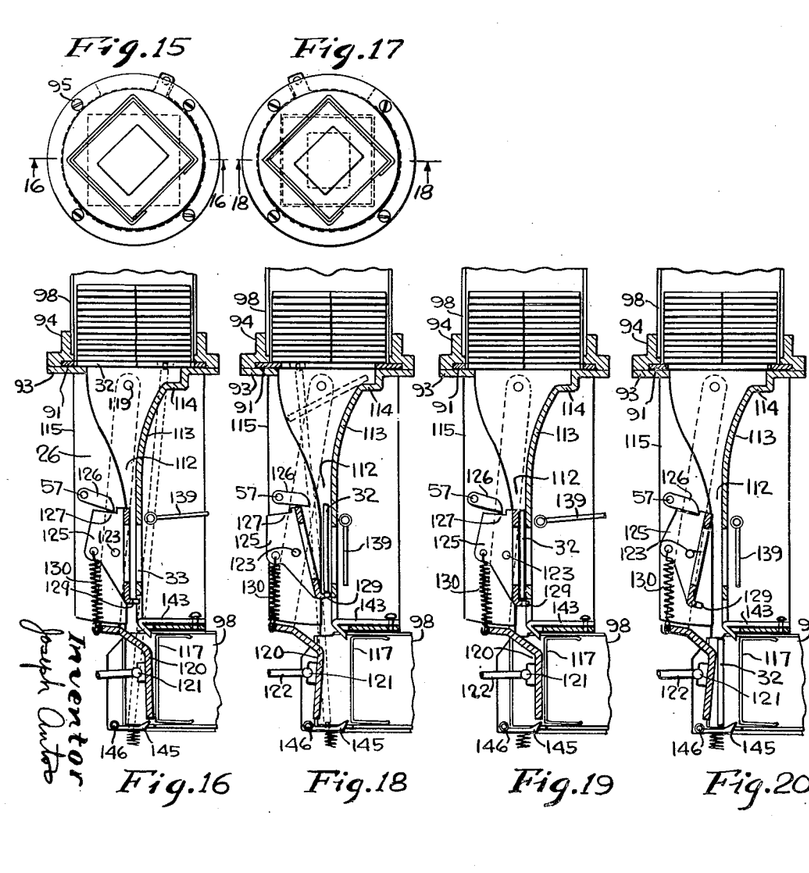
Figure 15 is a top view of the slide changing unit in a normal position.
Figure 16 is a vertical cross sectional view of Figure 15 at 16—16.
Figure 17 is a top view of slide changing unit, showing bottom slide rotated to a position to permit the slide to drop to the projecting position.
Figure 18 is a vertical cross section of Figure 17 at 18—18 showing the slide dropping and in projecting position with shutter closed.
Figure 19 is a vertical cross sectional view of the slide changing unit showing a slide clamped for projecting with the shutter open.
Figure 20 is a vertical cross sectional view of the slide changing unit showing the projected slide dropped into the lower container.

The lower slide 32 in the upper slide container 98 will drop into the square opening 92 of the separating and rotating plate 91 (see Figures 10, 15 and 16 for the normal position). Then set the lamp switch 89 and the motor switch 90 in the "on" position. This will start the rotation of the motor 27 and the light bulb 13 will light. As the motor 27 rotates (see Figures 7, 8, 12 and 13), the worm 29 will rotate the worm gear 35 and the cam 65, causing a rocking movement of the lever 60, and the pawl 63 engages the ratchet wheel 66 and rotates step cam 67, which is a part of the ratchet wheel 66, until the time interval set by knob 58 has been reached. Then the vertical arm 71 will rapidly snap backward and cause the mercury 76 in the mercury switch 73 to roll up the incline and momentarily cover the two electrodes 74 and 75, closing the circuit and energizing the coil 79 (see Figures 9, 10 and 13), which will pull the lever 53, releasing the hook 54 from the notch 55, and permit the eccentric 38 to rotate and pull backward on the connecting rod 122, the ejecting pad 120 and the yoke 118, thus causing the bracket 135 to oscillate the lever 131 and move the separating and rotating plate 91 and the slide 32 approximately 45 degrees, which permits the slide 32 to drop horizontally into the square hole 100 and the guideway 112 until it strikes the step 114. This causes the slide 32 to drop vertically into the guideway 112 to the projecting position (see Figures 17 and 18). The continued rotation of the eccentric 38 moves the connecting rod 122, slide ejecting pad 120, the yoke 118 and the lever 131 to the normal position (see Figures 15, 16 and 19). Thus the slide 32 is clamped into the projecting position and the shutter 139 is opened to permit the projection of the slide 32 on the screen.

After the slide 32 has been projected on the screen 177 and the desired time for projection has elapsed, the continued operation of the worm gear 35 and the movement of the ratchet wheel 66 will again cause the step cam 67 to rotate until the vertical arm 71 snaps backward, causing the mercury switch 73 to again energize the coil 79 and pull on the lever 53, which releases the hook 54 from the notch 55 and permits the eccentric 38 to rotate and pull backward on the connecting rod 122, the ejecting pad 120, the yoke 118 to the position shown in Figure 20, and the screw 123 will move the slide positioning frame 125 to an open position (see Figure 20) and the projected slide 32 is permitted to drop into the lower slide container 98 and the shutter 139 is closed. By the continued rearward movement of the yoke 118, the connecting rod 122 and the ejecting pad 120 to the position shown in Figure 12, the screw 123 and the spring 130 will cause the trip latch 126 to release the positioning frame 125, which will assume the tilted position shown in Figure 12 and thus receive the new slide 32, which has just been released by the rotation of the separating and rotating plate 91.

By further rotation of the eccentric 38, the new slide 32 is clamped in position and the released slide 32 is pushed forward into the lower slide container 98, as shown in Figure 22, and the end gate 117, in cooperation with the upper slide retainer 143 and the lower slide retainer 145, keeps the projected slide 32 in an upright position. This procedure is continued until all the slides 32 in the upper slide container 98 have been projected and filed in the lower slide container 98 in the same sequence as projected.

*Description of the synchronizing of the sound reproducing unit and the projector with the slide changing unit*

Figure 26:
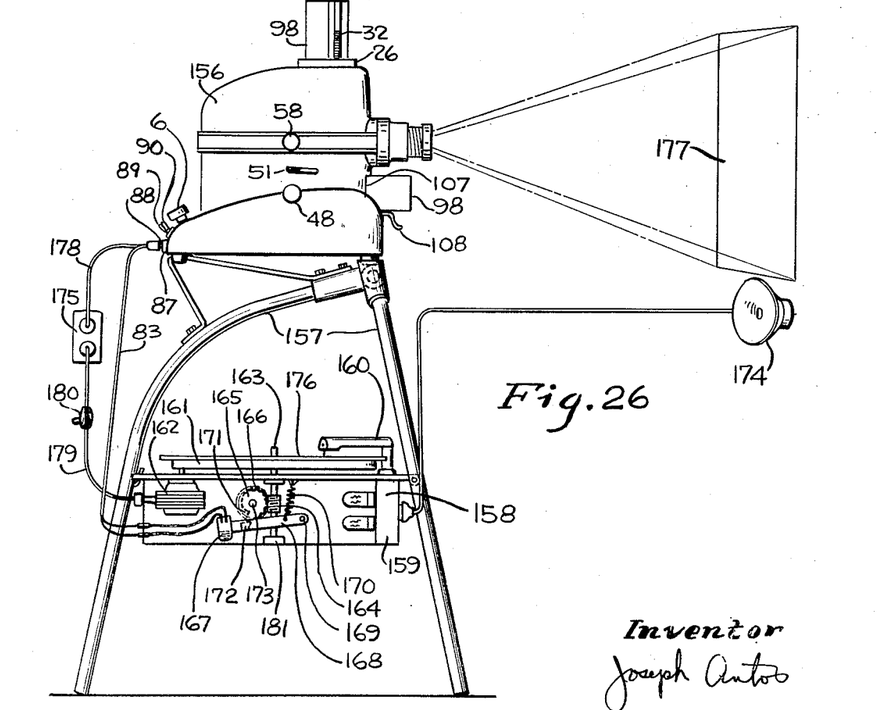
Figure 26 is a side view of Figure 1 projecting the picture and showing the record reproducing sound unit attached in position to automatically operate the slide changing and synchronize the same with the sound record.

Figure 26 shows a stand 157, which supports the projector 156 and the slide changing unit 26 (as previously described) and underneath the projector 156 and the slide changing unit 26 is a sound reproducing unit 158, which is synchronized with the slide changing unit 26 to automatically change the slide 32 at the proper time to corelate the subject matter of the sound record with the subject matter of the slides 32.

A conventional type of sound reproducing unit 158, consisting of the conventional amplifier 159 with the loud speaker 174, and a tone arm 160, a turntable 161 with a vertical shaft 163 connected thereto in the center thereof, centralizes the sound record 176, and the shaft 163 projects downward underneath the turntable 161 and has mounted thereon a worm 164. The shaft 163 is supported for rotation by a bearing 181 at the bottom of the reproducing unit 158. A motor 162 is mounted underneath the turntable 161 and rotates the turntable 161, the vertical shaft 163 and the worm 164. The worm 164 has engagement with the worm gear 166 and the step cam 165, which are assembled together and are mounted for up and down movement on the horizontal shaft 173.

The mercury switch 167 attached to the arm 168 is pivotally mounted on a horizontal shaft 169. The cam pin 172 is attached to the arm 168 and is held in contact with the step cam 165 by spring 170, attached to the arm 168, and the underside of the sound reproducing unit 158. The arm 168 could also be mounted above the step cam 165. The motor 162 of the sound reproducing unit 158 and the projector power plug 88 are connected to a common power receptacle 175. The projector plug 87 is connected to the mercury switch 167 leads. The step cam 165 can be made with more than one step 171 if desired, depending on the length of time required to reproduce the sound description of the slide 32, which is being shown by the projector 156. The location of two or more of the steps 171 and the size of the worm gear 165 can be arranged to vary the time of changing the slide 32 to suit the amount of time required to complete the description of the slide 32 being shown.

When it is desired to reproduce the sound description of the subject matter shown on the slides 32 to be projected on the screen 177, I connect the power plug 88 of the projector 156 (which includes the slide changing unit 26) by power supply cord 178 to receptacle 175, and the motor 162 by power supply cord 179 to receptacle 175. I then move the power switches 89, 90 and 180 to operating positions, which will light the lamp 13 and start the projector motor 27 and the sound reproducing motor 162. When the motor 162 starts to rotate the turntable 161 and the sound record 176, it also rotates the vertical shaft 163, the worm 164 and the worm gear 166, causing the step cam 165 to rotate therewith and when the step 171 is opposite the cam pin 172, it will be forced upward by the spring 170 with a quick motion, which will cause the mercury in the mercury switch 167 to make contact with the electrodes and energize the coil 79 of the projector 156 and operate the slide changing unit 26, permitting the slide which has been shown to drop into the lower slide container 98 and another slide 32 to fall into the projection position as previously described.

As the rotation of the sound record 176 continues, the slides 32 will be changed at the proper intervals, in accordance with the time limit previously determined and arranged for by the steps 171 of the step cam 165 and the said sound record 176. The slide changing unit 26 can also be controlled by the operator by the use of a remote control push button, as shown in Figure 25.

Figures 23, 24:
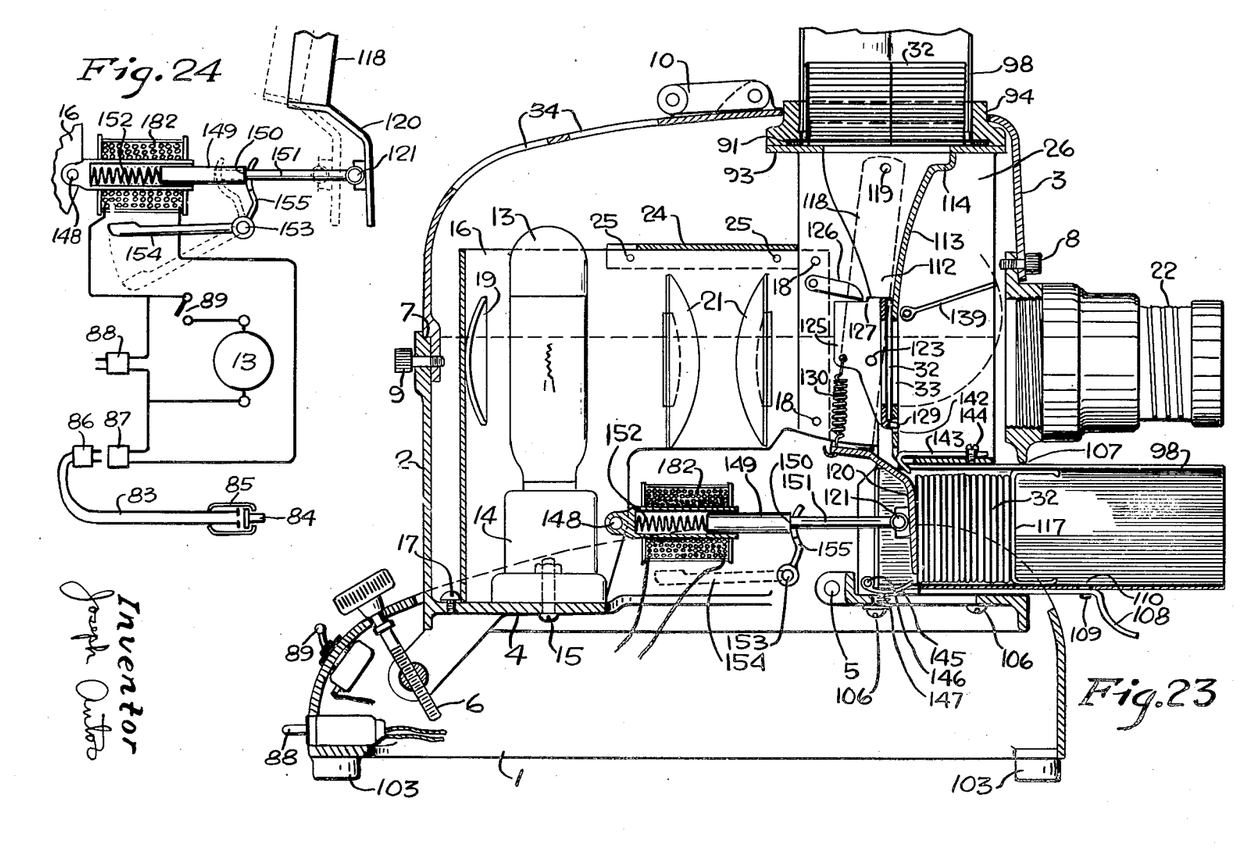
Figure 23 is a cross sectional view showing the slide changing unit with remote control and a manually operated device not motor driven.
Figure 24 shows the wiring diagram of the remote control and the manually operated device.

Another and more simplified means of controlling the operation of the slide changing unit 26 of the projector, either manually or by remote control, is shown in Figures 23 and 24. Here I show the projector previously described, but less certain parts. I omit the following parts:

Number
    27—motor
    29—worm
    30—fan
    31—screw
    35—worm gear
    36—horizontal shaft
    38—eccentric
    40—slidable collar
    41—shaft key
    43—long collar
    45—adjustable threaded collar
    46—spring
    48—knurled knob
    49—horizontal rod
    53—lever
    56—spring
    58—selector knob
    60—lever assembly
    63—pawl
    66—ratchet wheel
    67—step cam
    68—bearing screw
    69—spring cup washer
    70—pivot screw
    71—vertical arm
    73—mercury switch
    77—spring
    79—coil
    80—bracket
    81—cam
    82—spring And substitute these:

148—pin
    149—plunger
    150—shoulder
    151—stem
    152—spring
    153—shaft
    154—lever
    155—forked lever
    182—solenoid By remote control I produce the forward and backward movement of the yoke 118 and the ejecting pad 120, which operates the slide changing unit 26 for the changing of the slides 32. A solenoid 182 is mounted at the rear of the ejecting pad 120 by the pin 148 to the side of the shield 16, and a movable plunger 149 is fitted within the core of the solenoid 182. The front part of the movable plunger 149 is turned down to form a shoulder 150 and a stem 151 is connected to the ejecting pad 120 by the pin 121. The spring 152 is located within the core of the solenoid 182, which attracts the movable plunger 149, causing the ejecting pad 120 and the yoke 118 to be moved rearward. Releasing the button 84 of the switch 85 de-energizes the solenoid 182 and permits the spring 152 to push the movable plunger 149 forward, thus completing the rearward and forward movement of the ejecting pad 120 and the yoke 118, which causes the changing of the slides 32 as heretofore described.

For manual operation of the projector (see Figures 23 and 24), a shaft 153 extends crosswise and is pivotally supported by the side walls of the main body 2. The shaft 153 at one end, outside of the main body 2, is bent at right angles, forming the lever 154, and attached to the shaft 153 is an upstanding forked lever 155, the forked end of which engages the shoulder 150 of the movable plunger 149. By depressing the lever 154, the movable plunger 149 will cause the ejecting pad 120 and the yoke 118 to move rearward and compress the spring 152, and by releasing the lever 154, the spring 152 will cause the ejecting pad 120 and the yoke 118 to move forward, thus changing the slides 32 as desired.

This manual and remote control shown in Figures 23 and 24 can be used separately or in combination.

The slide changing unit shown in Figures 23 and 24 can be used for changing the slides in connection with the slide projectors now on the market, providing there is enough space, or it can be changed to have enough space between the condenser lens and the projecting lens. The simplified form of the slide changing unit, as shown on Figure 23, can be made to automatically operate in conjunction with the sound reproducing device shown in Figure 26. When the sound film record or wire has reproduced the description of the slide being shown, electrical contact will automatically be made with the solenoid 182 and the stem 151 will be moved and the slide 32 just shown will drop into the lower slide container 98. The slide changing unit 26 will revolve approximately 45 degrees and permit the next slide 32 to drop to the projecting position. This will be repeated until the sound reproduction has been completed and the slides 32 in the upper slide container 98 which relate to the sound reproduction have been shown. This combination will be automatic.

Having thus described my invention, what I claim as new and useful and desire to secure by Letters Patent is:

1. In a slide projector, in combination, an automatic slide changing device having a substantially vertical guideway with a square opening at the top tapering to a rectangular shape at the bottom, a socket having a square opening attached to the top of said guideway and the square openings in said guideway and said socket being out of alignment, a rotating plate having a square hole mounted for rotating movement in said socket above said guideway, a U-shaped member attached to the sides of said guideway for oscillating movement having a slide ejector attached to the lower portion of said U-shape member, an oscillating member mounted on one of the sides of said guideway and attached to said rotating plate, a bracket attached to one side of the said U-shape member contacting said oscillating member, duplicate slide containers, one inserted vertically in the top of said socket to feed said slides to said socket and the other in a horizontal position at the bottom of said guideway to receive the projected slides, a slide positioning frame on the inside of the sides of the said guideway and attached to said U-shape member, a ratchet mounted on the inside of the sides of said guideway to engage said slide positioning frame, means to cause forward and backward movement to said slide ejector and said U-shape member to oscillate said oscillating member and rotate the said rotating plate to remove one slide at a time from said socket and the upper slide container and permit gravity to cause the said slide to drop to the projecting position, and after projecting said slide to permit the slide to drop by gravity into the lower slide container in front of said slide ejector and by the forward movement of said slide ejector to move said slide in said lower slide container.

2. A slide changing unit to be used in connection with a slide projector, consisting of a vertical guideway having a square opening at the top tapering to a rectangular shape at or near the center, a socket having a square opening of the same dimensions as guideway mounted at the top thereof for receiving an upper slide container, rotating means having a square opening the same size as said socket mounted between said socket and said guideway, a U-shape member having a slide ejector on bottom mounted on the sides of the guideway for oscillating movement, a slide receiving and positioning member mounted on said U-shape member and suspended in said guideway near the center thereof, an attachment at the lower end of said guideway to receive a lower slide container for projected slides, a vertical member having one end mounted on the lower end of said guideway and opposite end attached to said rotating means, means to oscillate the said U-shape member to rotate said rotating means and remove one slide at a time from said upper slide container to permit said slide to drop to a projecting position and after projecting to drop into the lower slide container in the same sequence as projected.

3. A slide projector, in combination, a slide changing unit having a substantially vertical slide guideway, a socket attached to the top of said guideway for supporting an upper slide container having a vertical stack of horizontal slides therein for gravity feeding, a rotating and separating plate mounted in said socket under said container to remove one slide at a time from said container to permit said slide to drop horizontally onto a ledge in the upper forward portion of said guideway causing said slide to tilt and drop vertically to a projecting position in a slide positioning frame of said guideway, a horizontal opening under the bottom of said guideway to receive a lower slide container, means mounted on said projector and slide changing unit to rotate said separating and rotating plate to remove one slide at a time from said container and permit said slide to drop vertically to the slide positioning frame in said guideway for projecting, and after projecting to cause said slide positioning frame to release and drop said projected slide into the lower container, means to push the projected slides forward into the lower container, upper and lower latch means in said opening to hold the said slides in a vertical position in same sequential order as projected.

4. A slide projector, in combination, an automatic slide changing unit as of claim 1, sound reproducing units having sound records describing the subject matter of the slide to be projected, automatic control means mounted on the slide projector connected to said slide changing unit and sound producing unit to automatically rotate the rotating plate to change the slides by the sound records.

5. A slide projector, in combination, an automatic slide changing unit as of claim 1, means mounted on said slide projector and automatic slide changing unit to predetermine the amount of time allowed for projecting said slides on the screen.

6. A slide projector, in combination, a slide changing unit as of claim 1, means mounted on said slide changing unit at the control of the operator to predetermine the length of time for projecting the slides.

7. A slide projector, in combination, with a slide changing unit as of claim 1, a remote control device connected to said slide changing unit to permit the operator to control the changing of the slides and to determine the length of time for projecting the slides on a screen.

8. A slide projector, in combination, an automatic slide changing unit of claim 1, an adjustable timing device having a knob and a dial mounted on the side of the projector connected to said automatic slide changing unit, rotation of said knob on said dial toward the right or left determining the amount of time to be consumed in projecting and changing each slide and will automatically continue at the same speed until the operator turns the knob to a different position.

9. An automatic slide changing unit as of claim 1, a slide container made in a U-shape having the two top edges and one end flanged, said slide container having notches in one end of the top flanges to permit the projected slide to drop into the container, a U-shape friction plate at the forward end to hold the projected slides upright and to move endwise in the container with the projected slide after each projection.

10. In a slide projector, in combination, a slide changing mechanism with an approximately vertical guideway, a removable slide container mounted vertically at the top of said guideway, a rotating plate having an opening therein same size as said slide mounted for rotation under said container above said guideway, said slide container mounted at an angle with said guideway, means to rotate said rotating plate to aline said slide with said guideway to permit said slide to drop horizontally into said guideway and tilt vertically to the projecting position, a removable lower slide container mounted under said guideway and the projecting lens to receive said slide after projecting, means attached to said projector to rotate said rotating plate and remove one slide at a time from said upper container and after projecting to permit said slide to drop into said lower slide container in the same sequence as the slides were in the upper container.

11. A slide projector, in combination, a slide changing unit having a substantially vertical slide guideway with an opening the same size as the slide to be projected and tapered to a rectangular shape at the projecting position, a socket adjustable for slides of various thicknesses attached to the top of said guideway for supporting a removable upper slide container having a vertical stack of horizontal slides therein for gravity feeding, a rotating and separating plate mounted in said socket under said container to remove one slide at a time from said container to permit said slide to drop horizontally onto a ledge in the upper forward portion of said guideway causing said slide to tilt and drop vertically to a projecting position in a slide positioning frame of said guideway, a horizontal opening under the bottom of said guideway to receive a removable lower slide container, means mounted on said projector and slide changing unit to rotate said separating and rotating plate to remove one slide at a time from said upper container and permit said slide to drop vertically to the slide positioning frame in said guideway for projecting, and after projecting to cause said slide poistioning frame to release and drop said projected slide into the lower container, means to push the projected slides forward into said lower container, upper and lower latch means in said opening to hold the said slides in a vertical position in same sequential order as projected.

12. A slide projector, in combination, a slide changing unit consisting of an approximately vertical slide guideway having an opening at the top the same size as the slide tapering to a rectangular shape at the projecting position mounted in said slide projector between the condenser and projecting lenses and extending upwardly through the top of slide projector, a removable upper slide container mounted above and at an angle with the upper end of said guideway, means at upper end of said guideway to permit adjustments for slides of various thicknesses, horizontal rotating means in the upper end of said guideways under said upper container to remove a single slide from said upper container and align said slide with said guideway to permit said slide to drop by gravity to a vertical projecting position and after projecting to release said slide to permit it to drop by gravity into a lower container duplicate of the upper container under the lower end of said guideway, means to open and close a shutter during the changing of the slides, means operatable with said horizontal rotating means to push the projected slides forward in said lower container and means in said lower container to retain said slides in the same sequential order as projected.

13. A slide projecting machine having a frame and condensing and projecting lenses, in combination, a vertical slide changing unit having a slide guideway mounted in said projecting machine between said condensing and projecting lenses, a removable upper slide container having a vertical stack of horizontal slides therein mounted vertically on the top of said slide changing unit, a horizontal rotating plate having an opening to receive one slide at a time rotatably mounted at the upper end of said slide changing unit under said slide container, power means mounted on said frame operatively connected to said slide changing unit and said rotating plate, control means on said frame to control the power means to cause the rotation of said rotating plate to remove said slides one at a time from said upper slide container to permit said slide to drop by gravity horizontally and then vertically in said guideway to the projecting position and after being projected to drop into another removable slide container duplicate of the upper slide container under said guideway in same sequence as they were in said upper slide container.

14. A slide projector, in combination, a slide changing unit having a substantially vertical slide guideway, a socket attached to the top of said guideway for supporting an upper slide container having a vertical stack of horizontal slides therein for gravity feeding, a rotating and separating plate mounted in said socket under said container to remove one slide at a time from said container to permit said slide to drop horizontally onto a ledge in the upper forward portion of said guideway causing said slide to tilt and drop vertically to a projecting position into a slide positioning frame of said guideway, a horizontal opening under the bottom of said guideway to receive a lower slide container, an electric motor mounted on said projector and slide changing unit to rotate said separating and rotating plate to remove one slide at a time from said upper container and permit said slide to drop vertically to the slide positioning frame in said guideway for projecting, and after projecting to cause said slide positioning frame to release and drop said projected slide into the lower container, means to push the projected slides forward into the lower container, upper and lower latch means in said opening to hold the said slides in a vertical position in same sequential order as projected, control means attached to said projector and slide changing unit to control the rotation of said electric motor to permit the operator to change the slides at will.

15. In a slide projector, in combination, a slide changing mechanism with an approximately vertical guideway, a removable upper slide container having a vertical stack of slides mounted vertically at the top of said guideway, a rotating plate having an opening therein slightly larger than the size of said slides mounted for rotation under said container above said guideway, said slide container mounted at an angle with said guideway, means to rotate said rotating plate to aline said slides with said guideway to permit a single slide at a time to drop by gravity horizontally into said guideway and tilt vertically to the projecting position, a shutter operatively connected to said rotary plate to block out the light when changing slides, a removable lower slide container duplicate of the upper slide container mounted under said guideway and the projecting lens to receive said slides after projecting, electrical means attached to said slide changing mechanism and slide projector to rotate said rotating plate to control said shutter and remove one slide at a time from said upper slide container and after projecting to permit said slide to drop into said lower slide container in the same sequence as the slides were in the upper slide container, an automatic timing device attached to said slide changing mechanism and said electrical means, control means on said automatic timing device which can be set by the operator at a predetermined time limit for the projection of said slides.

16. In a slide projector, in combination, a slide changing mechanism having a substantially vertical slide guideway with an opening at the top slightly larger than the size of the slides to be projected and tapered to a rectangular shape at the projecting position, a socket having adjustable means to permit the use of slides of various thickness attached to the top of said guideway for vertically supporting a removable slide container to hold and to permit gravity feeding of slides to be projected, means under said container to remove one slide at a time and permit said slide to drop vertically to the projecting position, means to permit said projected slide to drop into a horizontally positioned duplicate slide container located under said projecting position, means mounted on the said projector and slide changing mechanism to remove one slide at a time from said upper container and drop vertically to projecting position and after being projected to release and drop said slide into said lower horizontal container having means therein to hold